(12) United States Patent
Kyung

(10) Patent No.: US 10,051,263 B2
(45) Date of Patent: Aug. 14, 2018

(54) MULTI-APERTURE CAMERA SYSTEM USING SCAN LINE PROCESSING

(71) Applicant: CENTER FOR INTEGRATED SMART SENSORS FOUNDATION, Yuseong-gu, Daejeon (KR)

(72) Inventor: Chong Min Kyung, Yuseong-gu (KR)

(73) Assignee: CENTER FOR INTEGRATED SMART SENSORS FOUNDATION, Daejeon (KR)

(*) Notice: Subject to any disclaimer, the term of this patent is extended or adjusted under 35 U.S.C. 154(b) by 84 days.

(21) Appl. No.: 15/246,696

(22) Filed: Aug. 25, 2016

(65) Prior Publication Data

US 2017/0148169 A1    May 25, 2017

(30) Foreign Application Priority Data

Nov. 23, 2015 (KR) .................. 10-2015-0164214
Nov. 23, 2015 (KR) .................. 10-2015-0164226
Feb. 1, 2016 (KR) .................. 10-2016-0012382

(51) Int. Cl.
| | |
|---|---|
| *H04N 9/04* | (2006.01) |
| *H04N 5/33* | (2006.01) |
| *H04N 13/271* | (2018.01) |
| *H04N 5/222* | (2006.01) |
| *G06T 7/593* | (2017.01) |
| *H04N 13/214* | (2018.01) |
| *H04N 13/257* | (2018.01) |
| *H04N 13/00* | (2018.01) |

(52) U.S. Cl.
CPC ........... *H04N 13/271* (2018.05); *G06T 7/593* (2017.01); *H04N 5/2226* (2013.01); *H04N 5/332* (2013.01); *H04N 9/045* (2013.01); *H04N 13/214* (2018.05); *H04N 13/257* (2018.05); *G06T 2207/10024* (2013.01); *H04N 2013/0081* (2013.01)

(58) Field of Classification Search
None
See application file for complete search history.

(56) References Cited

U.S. PATENT DOCUMENTS

| | | | | | |
|---|---|---|---|---|---|
| 5,608,538 | A | * | 3/1997 | Edgar | ........ H04N 1/047 358/302 |
| 5,864,367 | A | * | 1/1999 | Clatanoff | ........ H04N 7/007 348/441 |
| 6,834,119 | B2 | * | 12/2004 | Chen | ........ G06T 7/33 382/154 |

(Continued)

*Primary Examiner* — Frederick D Bailey
(74) *Attorney, Agent, or Firm* — Schmeiser, Olsen & Watts LLP

(57) ABSTRACT

The multi-aperture camera system includes a first aperture receiving an RGB optical signal, a second aperture distinguished from the first aperture and receiving an optical signal of which a wavelength is different from that of the RGB optical signal, an image sensor, a plurality of frame buffers, wherein the first and second images are respectively stored in the frame buffers, and a scan line-based processor unit (SPU) processing the first and second images using a scan line processing technique to determine a depth at at least one pixel of the first and second images. The first aperture and the second aperture are formed on a single optical system so as to be offset in a horizontal direction of the image sensor and thus have center positions deviated from each other.

16 Claims, 12 Drawing Sheets

(56) References Cited

U.S. PATENT DOCUMENTS

| | | | | |
|---|---|---|---|---|
| 2002/0186891 | A1* | 12/2002 | Peters | G06T 9/007 |
| | | | | 382/239 |
| 2003/0095119 | A1* | 5/2003 | Jeong | H04N 13/0014 |
| | | | | 345/419 |
| 2011/0044531 | A1* | 2/2011 | Zhang | H04N 13/0022 |
| | | | | 382/154 |
| 2011/0298917 | A1* | 12/2011 | Yanagita | G03B 5/02 |
| | | | | 348/135 |
| 2014/0266803 | A1* | 9/2014 | Bulan | G06K 9/00785 |
| | | | | 340/932.2 |
| 2016/0042522 | A1* | 2/2016 | Wajs | H04N 5/2254 |
| | | | | 348/335 |
| 2016/0100103 | A1* | 4/2016 | Takahashi | G06T 5/50 |
| | | | | 348/222.1 |
| 2016/0320951 | A1* | 11/2016 | Ernst | G06F 3/04842 |

\* cited by examiner

FIG. 7

| Algorithm: Hardware Functions in the SPU |
|---|
| 1: Set scanline $(w_s, h_s)$ |
| 2: for the s-$B_p$ (source pattern buffer) for the each pixel in scanline do |
| 3:    Set search region $(w_r, h_r)$ from search range window and $\theta$ |
| 4:    for each t-$B_p$(target pattern buffer) in search region $(w_r, h_r)$ do |
| 5:      Compute their similarity to find the matching score between the RGB and IR pattern in the s-$B_p$ and t-$B_p$ |
| 6:    end for |
| 7:    Find $\mathrm{argmax}_{\mathrm{disparity}}\{\mathrm{similarity(disparity)}\}$ |
| 8:    Convert disparity to depth |
| 9:    Store depth to the depth frame buffer (or depth bit planes in the scanline buffer), which is stored to the depth bit planes in the frame buffer |
| 10: end for |
| 11: Move to next scanline |

MULTI-APERTURE CAMERA SYSTEM USING SCAN LINE PROCESSING

CROSS-REFERENCE TO RELATED APPLICATIONS

A claim for priority under 35 U.S.C. § 119 is made to Korean Patent Application No. 10-2015-0164226 filed Nov. 23, 2015, in the Korean Intellectual Property Office, a Korean patent application No. 10-2015-0164214 filed Nov. 23, 2015 in the Korean Intellectual Property Office, a Korean patent application No. 10-2016-0012382 filed on Feb. 1, 2016 in the Korean Intellectual Property Office, the entire contents of which are hereby incorporated by reference.

BACKGROUND

Embodiments of the inventive concepts described herein relate to a multi-aperture camera system using a scan line processing technique, and more particularly, relate to technology for processing images using the scan line processing technique in a multi-aperture camera system determining a depth using a disparity.

Technology which determines a depth about an object using a disparity between images obtained through a plurality of conventional apertures necessitates two optical systems each including apertures and image sensors. For example, in the technology, a depth about the object is determined using a disparity between images obtained by the image sensors of the two optical systems through the apertures thereof. Thus, the technology using the disparity between the images obtained through the conventional apertures is used in a stereo camera system.

As such, since using apertures of the two optical systems, the conventional stereo camera system is difficult in application to a miniaturized camera module, thereby causing an increase in cost of production and a need for additional calibration. Also, the conventional stereo camera system is problematic in that an exact depth cannot be calculated due to a calibration error.

Furthermore, in the conventional stereo camera system, the apertures are distributed to the two optical systems. For this reason, the conventional stereo camera system does not hardware-integrate and process the images obtained through the plurality of apertures to determine the depth. Since the images obtained through the plurality of apertures are processed in software, the procedure for determining the depth becomes more complicated.

Therefore, the following embodiments provide a multi-aperture camera system using a scan line processing technique in order to solve the disadvantages and problems of the conventional stereo camera system.

SUMMARY

One aspect of embodiments of the inventive concept is directed to provide a multi-aperture camera system using a scan line processing technique. The multi-aperture camera system may include a first aperture receiving an RGB optical signal, a second aperture distinguished from the first aperture and receiving an optical signal of which a wavelength is different from that of the RGB optical signal, an image sensor obtaining a first image by processing the RGB optical signal received by the first aperture and obtaining a second image by processing the optical signal, of which the wavelength is different from that of the RGB optical signal, received by the second aperture, a plurality of frame buffers, wherein the first and second images are respectively stored in the frame buffers, and a scan line-based processor unit (SPU) processing the first and second images using a scan line processing technique to determine a depth at at least one pixel of the first and second images. The first aperture and the second aperture may be formed on a single optical system so as to be offset in a horizontal direction of the image sensor and thus have center positions deviated from each other.

The SPU may include a scan line buffer storing a scan line window applied to the first image and a scan line window applied to the second image are stored, a source pattern buffer storing a source pattern window set to comprise the at least one pixel at the scan line window applied to the first image, a search range buffer storing a search range window set based on the source pattern window at the scan line window applied to the second image, a target pattern buffer storing a plurality of target pattern windows found at the search range window, and a processor controlling an operation of each of the plurality of frame buffers, the scan line buffer, the source pattern buffer, the search range buffer, and the target pattern buffer, calculating a correlation between each of the plurality of target pattern windows and the scan pattern window by performing image pattern matching about the plurality of target pattern windows with respect to the source pattern window, and determining a depth at the at least one pixel using a disparity between the source pattern window and a target pattern window, which maximizes the correlation, from among the plurality of target pattern windows.

The processor may search a region of the search range window based on a misalignment angle between an offset direction of the first and second apertures and a horizontal direction of the image sensor and may set the plurality of target pattern windows based on the search result.

The processor may search the region of the search range window in horizontal and vertical directions and may set the plurality of target pattern windows based on the search result.

The processor may set a height of the scan line window based on a misalignment angle between an offset direction of the first and second apertures and a horizontal direction of the image sensor, a maximum disparity generated between the first image and the second image as center positions of the first and second apertures are deviated from each other, a height of the source pattern window, and may set a width of the scan line window based on the first image and a width of the first image.

The processor may set a width of the search range based on the misalignment angle between an offset direction of the first and second apertures and a horizontal direction of the image sensor, a maximum disparity generated between the first image and the second image as center positions of the first and second apertures are deviated from each other, a height of the source pattern window, and may set a height of the search range window based on the height of the scan line window.

The processor may change a height and a width of each of the source pattern window and the plurality of target pattern windows into a plurality of values and may search for a region of the search range window to set the plurality of target pattern windows.

The processor may set a source pattern window with respect to the remaining region other than a predetermined boundary region at the scan line window applied to the first image.

The processor may determine a height and width of the source pattern window such that the image pattern matching is performed with respect to the at least one pixel.

The processor may determine a height and width of each of the plurality of target pattern windows based on the height and width of the source pattern window.

The SPU may further include a depth frame buffer storing a depth at the at least one pixel.

The processor may calculate a correlation between each of the plurality of target pattern windows and the source pattern window using a similarity/dissimilarity metric.

The processor may sequentially apply the scan line window in a vertical direction of each of the first and second images.

Another aspect of embodiments of the inventive concept is directed to provide a method for operating a multi-aperture camera system using a scan line processing technique, the method including receiving an RGB optical signal through a first aperture, receiving an optical signal, of which a wavelength is different from that of the RGB optical signal, through a second aperture distinguished from the first aperture, obtaining first and second images by processing the RGB optical signal received by the first aperture and an signal, of which a wavelength is different from that of the RGB optical signal, received by the second aperture, at an image sensor, and processing the first and second images in a scan line processing manner to determine a depth at at least one pixel of the first and second images, at a scan line-based processor unit (SPU). The first aperture and the second aperture may be formed on a single optical system so as to be offset in a horizontal direction of an image sensor and thus have center positions deviated from each other.

The determining of the depth about the at least one pixel may include setting a source pattern window so as to comprise the at least one pixel at a scan line window applied to the first image, setting a search range window at a scan line window applied to the second image based on the source pattern window, searching for a plurality of target pattern windows from the search range window, calculating a correlation between each of the plurality of target pattern windows and the source pattern window by performing image pattern matching about the plurality of target pattern windows with respect to the source pattern window, and determining a depth at the at least one pixel using a disparity between the source pattern window and a target pattern window, which maximizes the correlation, from among the plurality of target pattern windows.

The searching for the plurality of target pattern windows may include searching a region of the search range window based on a misalignment angle between an offset direction of the first and second apertures and a horizontal direction of the image sensor and setting the plurality of target pattern windows based on the search result.

The method may further include setting the scan line window based on a misalignment angle between an offset direction of the first and second apertures and a horizontal direction of the image sensor, a maximum disparity generated between the first image and the second image as center positions of the first and second apertures are deviated from each other, a height of the source pattern window, the first image, and a width of the first image.

The setting of the search range window may include setting the search range window based on a misalignment angle between an offset direction of the first and second apertures and a horizontal direction of the image sensor, a maximum disparity generated between the first image and the second image as center positions of the first and second apertures are deviated from each other, a width of the source pattern window, and a height of the scan line window.

The searching for the plurality of target pattern windows from the search range window may include changing a height and a width of each of the source pattern window and the plurality of target pattern windows into a plurality of values and searching for the a region of the search range window to set the plurality of target pattern windows.

Still another aspect of embodiments of the inventive concept is directed to provide a multi-aperture camera system using a disparity. The multi-aperture camera system may include a single optical system comprising a first aperture receiving an RGB optical signal and a second aperture receiving an optical signal of which a wavelength is different from that of the RGB optical signal and moving to be disposed at a plurality of positions, an image sensor obtaining a plurality of image sets corresponding to the plurality of positions as the single optical system is disposed at the plurality of positions, wherein each of the image sets comprises a first image obtained by processing the RGB optical signal received by the first aperture and a second image obtained by processing the optical signal, of which the wavelength is different from that of the RGB optical signal, received by the second aperture, a plurality of frame buffers, wherein the first and second images are respectively stored in the frame buffers, and a scanline-based processor unit (SPU) determining a depth at at least one pixel of the image sets using a disparity of each of the image sets calculated by processing each of the image sets through a scan line processing technique. The first aperture and the second aperture may be formed on a single optical system so as to be offset in a horizontal direction of the image sensor and thus have center positions deviated from each other.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 7 is a diagram illustrating an algorithm about an operation of a scan line-based processor unit according to an embodiment of the inventive concept;

DETAILED DESCRIPTION

Figure 1:
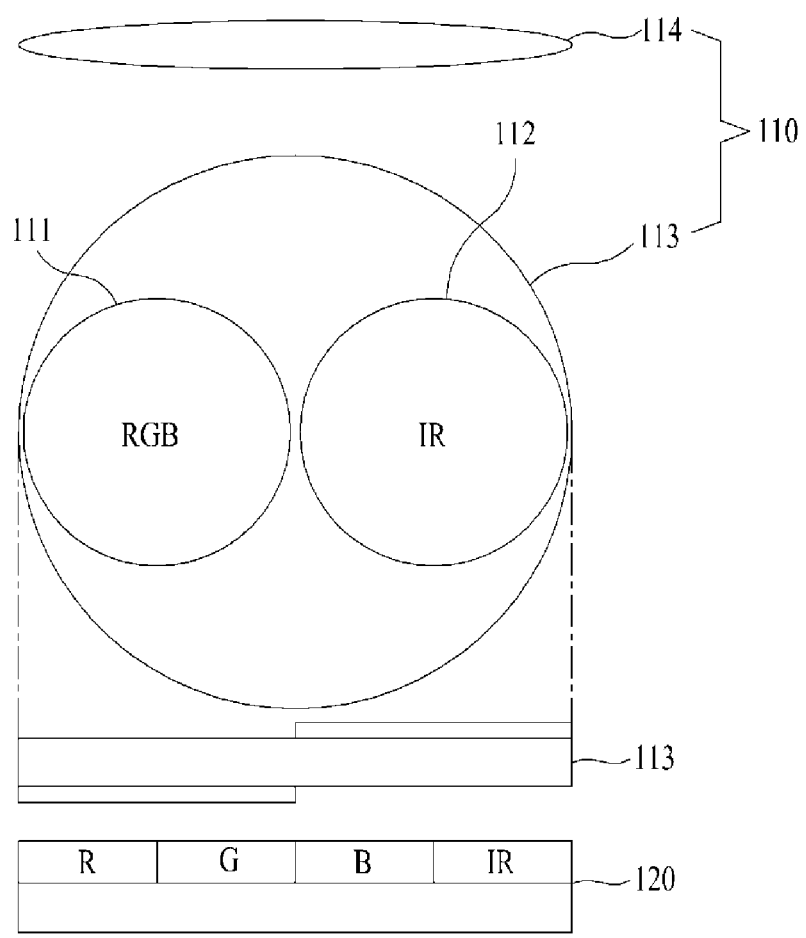
FIG. 1 is a diagram illustrating a multi-aperture camera system according to an embodiment of the inventive concept.

Below, embodiments of the inventive concept may be described with reference to the accompanying drawings. However, the scope and spirit of the inventive concept may not be limited thereto.

Moreover, the same reference numerals in the drawings denote like elements. Furthermore, the term (i.e., terminology) that are used in this specification as the terms used to describe the preferred embodiment of the invention as appropriate, which the user can vary depending on the intention or convention in the art to which the invention pertains the operator. Therefore, definition of the terms should be made according to throughout the present specification.

FIG. 1 is a diagram illustrating a multi-aperture camera system according to an embodiment of the inventive concept.

Referring to FIG. 1, a multi-aperture camera system according to an embodiment of the inventive concept may include a single optical system 110, an image sensor 120, a plurality of frame buffers (not illustrated) and a scan line-based processor unit (SPU) (not illustrated). Below, an embodiment of the inventive concept will be exemplified as the frame buffers and the SPU are included in the image sensor 120. However, the scope and spirit of the inventive concept may not be limited thereto. For example, the frame buffers and the SPU may be provided to be independent of the image sensor 120.

A first aperture 111 and a second aperture 112 may be formed on the single optical system 110 so as to be offset in a horizontal direction of the image sensor 120 and thus have center positions deviated from each other. In detail, the first aperture 111 and the second aperture 112 may be formed on a filter 113 contained in the single optical system 110 so as to be offset in the horizontal direction of the image sensor 120 and thus have the center positions deviated from each other (the single optical system 110 includes the filter 113 and a lens 114).

As the first aperture 111 and the second aperture 112 are formed to be offset in the horizontal direction of the image sensor 120 and thus have the center positions deviated from each other, a misalignment angle between an offset direction (i.e., a direction of a line which connects centers of the first aperture 111 and the second apertures 112) of the first aperture 111 and the second aperture 112 and a horizontal direction of the image sensor 120 may be set to be close to 0.

As such, as the misalignment angle between the offset direction of the first aperture 111 and the second aperture 112 and the horizontal direction of the image sensor 120 is set to be close to 0, a scan line processing technique may be easily applied to an image obtained through the first aperture 111 and a second image obtained through a second aperture 112. Thus, the complexity of an operation to determine a depth may be markedly improved.

That is, as compared with a conventional stereo camera, the multi-aperture camera system according to an embodiment of the inventive concept may simplify comparison of a first image and a second image from two-dimension or three-dimension to one-dimension. This dimensional simplification may be effective in reducing the amount of computation and the complexity of hardware structure.

Furthermore, in the case where a misalignment angle between the offset direction of the first aperture 111 and the second aperture 112 and the horizontal direction of the image sensor 120 is not set to be close to 0, the multi-aperture camera system may extend a region for searching the first image and the second image, which will be described with reference to the SPU.

In this case, diameters of the first and second apertures 111 and 112 may be the same as or different from each other. A shape of each of the first and second apertures 111 and 112 may be a polygon shape, including but not limited to a square, rhombus or triangle shape, or the like, as well as a circular or ellipse shape.

Furthermore, the first aperture 111 and the second aperture 112 may be independently formed not to be overlapped (or overlaid) each other on a filter 113 of the single optical system 110 or may be formed to be overlapped each other thereon. Alternatively, the second aperture 112 may be formed on the first aperture 111. In addition, an embodiment of the inventive concept is exemplified in FIG. 1 as the single optical system 110 includes the second aperture 112. However, the scope and spirit of the inventive concept may not be limited thereto. For example, the second aperture 112 may be provided in plurality so as to find a hidden region about an object. In this case, a plurality of second apertures may receive optical signals (e.g., optical signals with wavelengths, which are different from each other, from among wavelengths different from the RGB optical signal) with different wavelengths.

Here, the first aperture 111 may be formed to receive an RGB optical signal (e.g., an optical signal which has a wavelength between 400 nm to 650 nm) and the second aperture 112 may be formed to receive an optical signal with a wavelength different from the RGB optical signal. Below, an embodiment of the inventive concept will be exemplified as the second aperture 112 receives an IR optical signal (e.g., an optical signal which has a wavelength between 650 nm to 810 nm). However, the scope and spirit of the inventive concept may not be limited thereto. For example, the second aperture 112 may receive various optical signals with wavelengths different from the RGB optical signal.

For example, the first aperture 111 may be formed to receive an RGB optical signal, which is achieved by etching the front side (performing a function to cut off the RGB optical signal) of the filter 113 included in the single optical system 110 and maintaining the back side (performing a function to cut off an IR optical signal) of the filter 113 as it is (or without etching). Furthermore, the second aperture 112 may be formed to receive an IR optical signal, which is achieved by maintaining the front of the filter 113 as it is (or without etching) and etching the back of the filter 113. However, embodiments of the inventive concept may not be restrictive hereto. For example, the first aperture 111 and the second aperture 112 may be formed on the filter 113, which is included in a single optical system 110, with various manners so as to guide an RGB optical signal and an IR optical signal, respectively.

The image sensor 120 may include an RGB pixel, which is used to obtain a first image by processing an RGB optical signal received through the first aperture 111, and an IR pixel which is used to obtain a second image by processing an IP optical signal received through the second aperture 112. In this case, the image sensor 120 may perform not only a function to process the RGB optical signal so as to be converted into an RGB digital image signal and to process the IR light and so as to be converted into an IR digital image signal, but also an image signal processor (ISP) function to generate a first image from the RGB digital image signal and a second image from the IR digital image signal. Thus, below, the image sensor 120 may mean a complex module which performs an ISP function as well as a function about a general image sensor.

Here, the first image may be one of an R-image, a G-image, and a B-image separated and generated by the image sensor 120 from the RGB optical signal or may be an RGB image generated by integration of RGB optical signals.

The first and second images thus obtained may be respectively stored in a plurality of frame buffers. The first and second images stored in the frame buffers may be loaded under control of the SPU and may be used in the depth determination procedure (i.e., the procedure for applying a scan line window to each of the first and second images).

Thus, the SPU may determine a depth at at least one pixel of the first and second images using a disparity between the first image and the second image. A method to calculate a pixel depth using the disparity between plural images departs from the scope and spirit of the inventive concept and a description thereof is thus omitted.

In detail, based on the calculated disparity, the SPU may calculate a disparity between a predetermined source pattern window (i.e., a window which has a width and a height previously determined relative to at least one pixel), which is set to include at least one pixel used to determine a depth at the first image, and a region of the second image (i.e., a plurality of target pattern windows) corresponding to the source pattern window.

The determined depth at the at least one pixel may be stored in a depth frame buffer (not illustrated).

In particular, the SPU may use the scan line processing technique during the procedure for searching for a plurality of target pattern windows being a region of the second image corresponding to the source pattern window. For example, in the case that a misalignment angle between the offset direction of the first aperture 111 and the second aperture 112 and the horizontal direction of the image sensor 120 is set to be close lose to 0, the SPU may extend a region for searching the first and second images only in the horizontal direction. In the case where a misalignment angle between the offset direction of the first aperture 111 and the second aperture 112 and the horizontal direction of the image sensor 120 is not set to be close to 0, the SPU may extent a region for searching the first and second images in a vertical direction as well as in a horizontal direction, based on the misalignment angle between the offset direction of the first aperture 111 and the second aperture 112 and the horizontal direction of the image sensor 120.

As such, the multi-aperture camera system according to an embodiment of the inventive concept may process, using the scan line processing technique, the first and second images obtained using the first and second apertures 111 and 112 which are formed on the single optical system 110 so as to be offset in horizontal direction of the image sensor 120 and thus have center positions deviated from each other. Accordingly, the multi-aperture camera system may exactly calculate a depth at the at least one pixel with the low complexity of computation with respect to an object and may be manufactured in a compact size and low cost compared with a conventional stereo camera.

Furthermore, the multi-aperture camera system may omit the calibration procedure which the conventional stereo camera necessitates, thereby solving the problem that an exact depth is not calculated due to a calibration error. The multi-aperture camera system may receive RGB optical signals, without damage, through the first aperture 111, thereby obtaining a high-quality RGB image with the low complexity without the procedure for processing an image signal.

Figure 2:
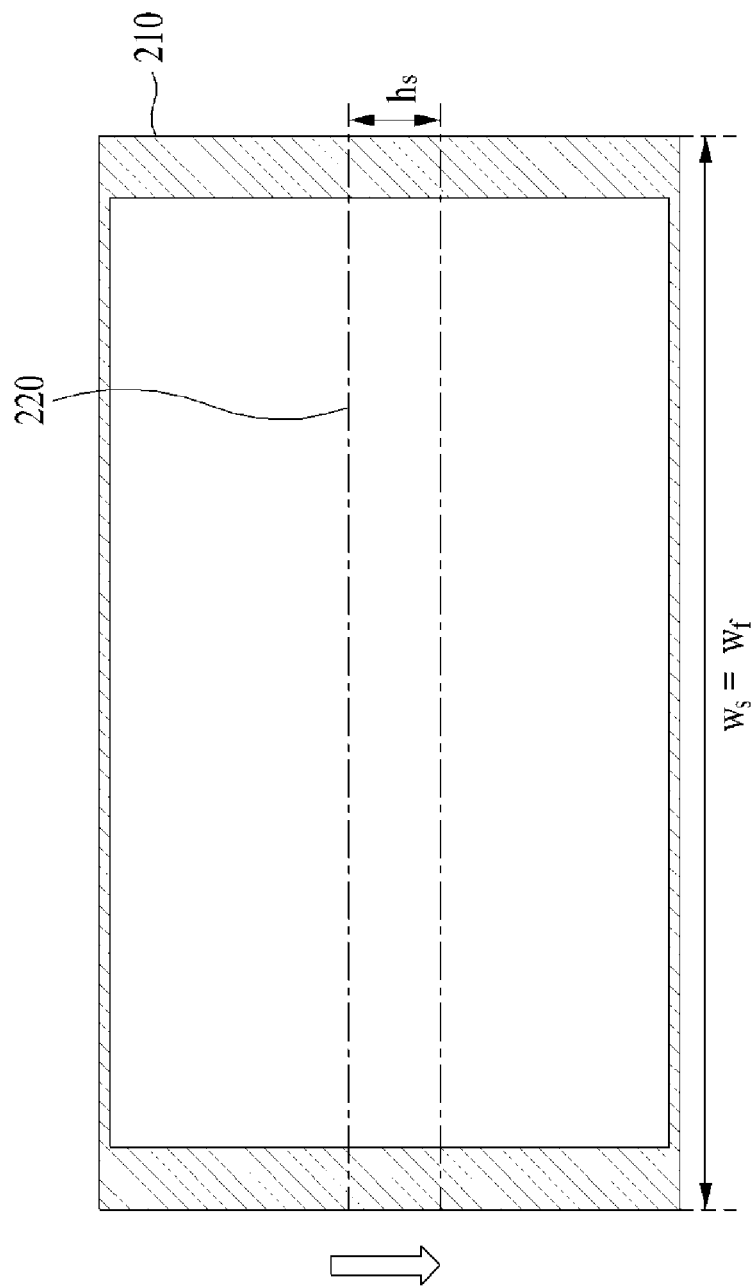
FIG. 2 is a diagram illustrating the procedure where a scan line-based processor unit included in a multi-aperture camera system according to an embodiment of the inventive concept applies a scan line window to each of first and second images.

FIG. 2 is a diagram illustrating the procedure where a scan line-based processor unit (SPU) included in a multi-aperture camera system according to an embodiment of the inventive concept applies a scan line window to each of first and second images.

Referring to FIG. 2, the multi-aperture camera system according to an embodiment may apply a scan line window 220 to each of the first image and the second image 210. For example, the SPU included in the multi-aperture camera system may sequentially apply the scan line window 220 to a vertical direction of each of the first image and the second image 210 (e.g., the scan line window 220 may be applied, for each line corresponding to a height of the scan line window 220, in a vertical direction of each of the first image and the second image 210).

Here, to set a source pattern window and a plurality of target pattern windows respectively at the first image and the second image 210 before the procedure for calculating a disparity between a source pattern window of the first image to be described below and each of a plurality of target pattern windows corresponding to the source pattern window, the SPU may apply the scan line window 220 such that each of the first image and the second image 210 is divided for each region.

Thus, the SPU may store the scan line window 220 applied to each of the first image and the second image 210 in a scan line buffer. The SPU may load the scan line window 220 applied to each of the first image and the second image 210, if necessary, and may use the loaded scan line window 220 during the procedure for determining the depth (e.g., including setting the source pattern window at the scan line window 220 applied to the first image and setting a search window range at the scan line window 220 applied to the second image).

In this case, a width $W_s$ of the scan line window 220 may be set based on a width $W_f$ of each of the first image and the second image 210 (e.g., the width of the scan line window 220 is set to be equal to the width of each of the first image and the second image 210). A height $h_s$ of the scan line window 220 may be set based on a misalignment angle between an offset direction of the first aperture and the second aperture and a horizontal direction of the image sensor, a maximum disparity generated between the first image and the second image 210 as a center position of the first aperture and a center position of the second aperture are deviated from each other, and a height $h_p$ of a source pattern window, as shown in Equation 1.

$$h_s = h_p + 2 \cdot \text{Disparity}_{max} \cdot \sin\theta \quad \text{[Equation 1]}$$

In Equation 1, $h_s$ may denote a height of the scan line window 220. $H_p$ may denote a height of the source pattern window. $\text{Disparity}_{max}$ may denote a maximum disparity generated between the first image and the second image 210 as center positions of the first and second apertures are deviated from each other. θ may denote a misalignment angle between an offset direction of the first aperture and the second aperture and a horizontal direction of the image sensor. A detailed description about the misalignment angle between an offset direction of the first aperture 111 and the second aperture 112 and a horizontal direction of the image sensor 120 will be given with reference to FIG. 3.

As such, as the scan line window 220 is sequentially applied to a vertical direction with respect to the whole region of the first image and the second image 210, the SPU may determine a depth with respect to the whole region of the first image and the second image 210.

Figure 3:
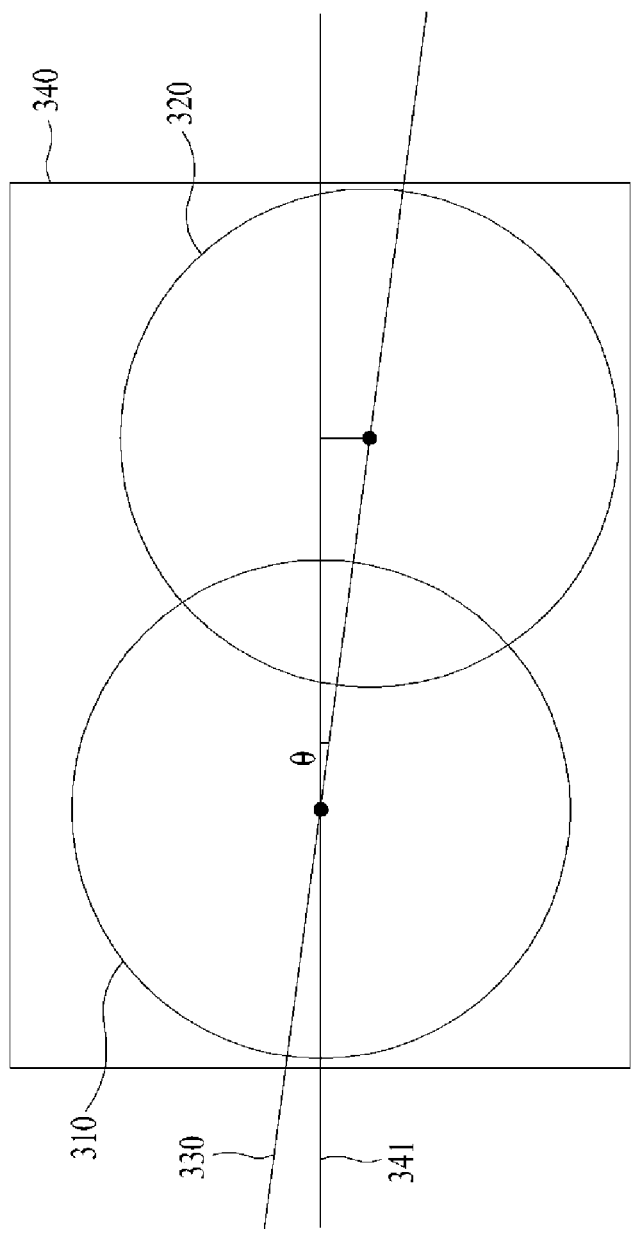
FIG. 3 is a diagram illustrating a misalignment angle between an offset direction of a first aperture and a second aperture and a horizontal direction of an image sensor, according to an embodiment of the inventive concept.

FIG. 3 is a diagram illustrating a misalignment angle between an offset direction of a first aperture and a second aperture and a horizontal direction of an image sensor, according to an embodiment of the inventive concept.

Referring to FIG. 3, the multi-aperture camera system according to an embodiment of the inventive concept may set a misalignment angle θ between an offset direction 330 (i.e., a direction of a line which connects centers of first and second apertures 310 and 320) of the first aperture 310 and the second aperture 320 and a horizontal direction 341 of an image sensor 340 so as to be close to zero. Here, the horizontal direction 341 of the image sensor 340 may mean the same direction as a direction where an image is processed using the scan line processing technique.

In this case, the direction where the image is processed using the scan line processing technique may be the same as the offset direction 330 of the first aperture 310 and the second aperture 330. For this reason, during the procedure for processing an image in the scan line manner, the SPU may extend a region of the first image only in a horizontal direction to set a source pattern window at the first image and may perform a search operation. During the procedure, the SPU may extend a region of the second image only in a horizontal direction to set a plurality of target pattern windows corresponding to source pattern windows at the second image.

At this time, during the procedure for extending and searching a region of the second image only in the horizontal direction, the SPU may set a search range window of a constant width at the second image to the extent that a plurality of target pattern windows corresponding to the source pattern windows exists, to further reduce the complexity of the search operation. For example, the SPU may set a width of the search range window by adding the fluctuations of a width corresponding to a maximum disparity generated between the first image and the second image on a width basis of the source pattern windows, which will be described with reference to FIG. 5.

However, in the case where a misalignment angle θ is not set ideally to be close to 0, a direction where an image is processed using the scan line processing technique may not be the same as an offset direction 330 of the first aperture 310 and second aperture 320. For this reason, during the procedure for processing an image in the scan line technique, the SPU may extend a region of the second image in further consideration of the misalignment angle θ and may perform a search operation.

In detail, to set a plurality of target pattern windows corresponding to a source pattern window at the second image, the SPU may extend a region of the second image not only in a horizontal direction but also in a vertical direction by adding the fluctuations of a height corresponding to a maximum disparity generated between the first image and the second image in the light of the misalignment angle θ on a height basis of a source pattern window.

Likewise, in the case where a misalignment angle θ is not set ideally to be close to 0, during the procedure for extending a region of the second image in a horizontal direction and performing a search operation, the SPU may set a search range window of a constant width at the second image to the extent that a plurality of target pattern windows corresponding to the source pattern windows exists, to further reduce the complexity of the search operation. For example, the SPU may set a width of a search range window by adding the fluctuations of a width corresponding to a maximum disparity generated between the first image and the second image in the light of a misalignment angle θ on a width basis of a source pattern window, which will be described with reference to FIG. 5.

Figure 4:
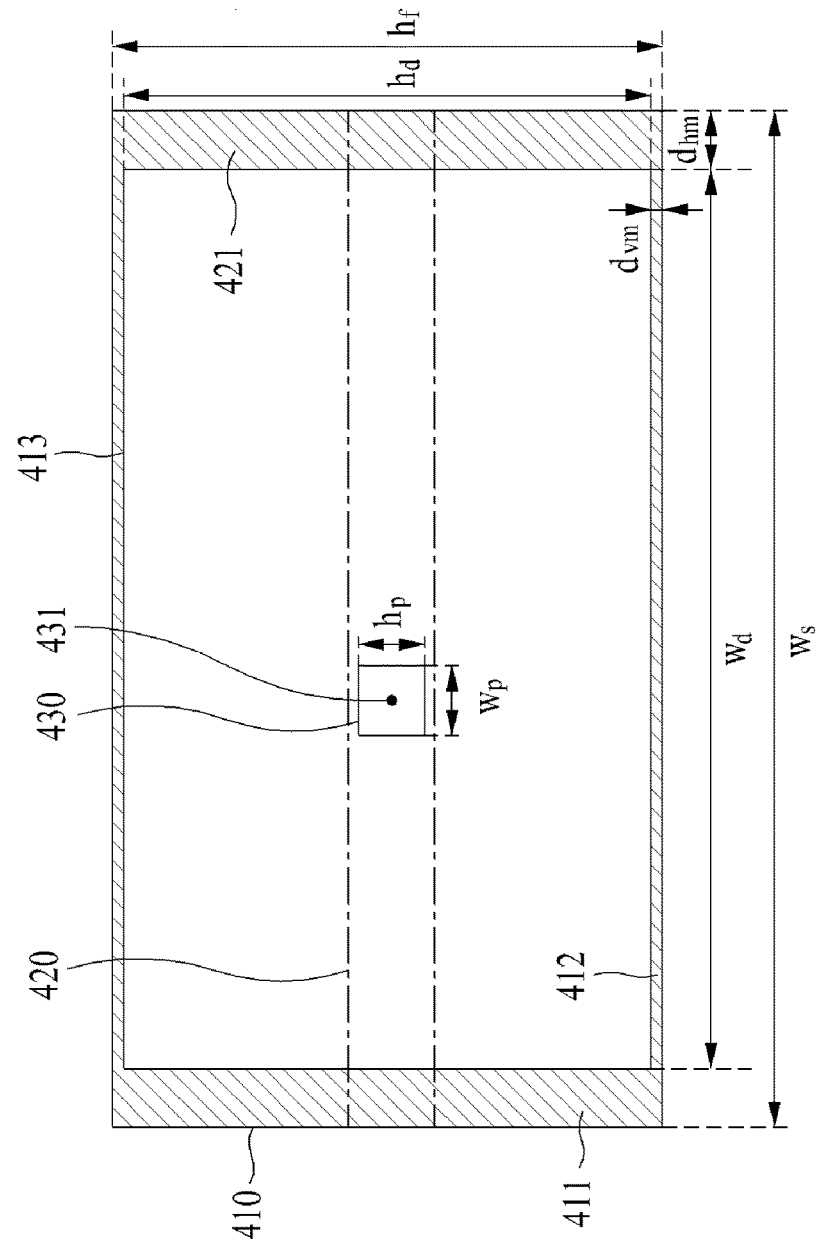
FIG. 4 is a diagram illustrating the procedure where a scan line-based processor unit according to an embodiment of the inventive concept sets a source pattern window.

FIG. 4 is a diagram illustrating the procedure where a scan line-based processor unit (SPU) according to an embodiment of the inventive concept sets a source pattern window.

Referring to FIG. 4, the multi-aperture camera system according to an embodiment of the inventive concept sets a source pattern window 430 so as to contain at least one pixel 431 at a scan line window 420 applied to a first image 410. Here, the at least one pixel 431 may be a pixel 431 for determining a depth at the first image 410 and may mean a pixel, of which the edge is detected, from among a plurality of pixels contained in the first image 410.

Thus, the SPU may store the source pattern window 430, set as described above, in a source pattern buffer. The SPU may load the source pattern window 430 and may use it during the procedure for determining a depth (i.e., the procedure for calculating a correlation between each of a plurality of target pattern windows and the source pattern window 430 by performing image pattern matching about the target pattern windows with respect to the source pattern window 430).

At this time, the SPU included in the multi-aperture camera system may set a source pattern window 430 with respect to a reaming region (e.g., a width $W_d$ of the remaining region is calculated by subtracting twice a width $d_{hm}$ of a predetermined boundary region 421 from a width $W_s$ of the scan line window 420) other than the predetermined boundary region 421 at the scan line window 420 applied to the first image 410. That is, the source pattern window 430 may be set with respect to a remaining interest region 413 other than a horizontal boundary region 412 and a vertical boundary region 412 of the first image 410. Here, a width of the remaining interest region 413 may be the same as the width $W_d$ of the remaining region of the scan line window 420, and a height $H_d$ of the remaining interest region 413 may be calculated by subtracting twice a height $d_{vm}$ of the vertical boundary region 412 from a height $h_f$ of the first image 410 (or a second image).

Furthermore, the SPU may determine a height $h_p$ and a width $W_p$ of the source pattern window to be greater than or equal to a constant value, to allow image pattern matching to be performed with respect to at least one pixel 431. As such, the determining of the height and width of the source pattern window may be performed before applying the scan line window 420 to the first image 410.

Figure 5:
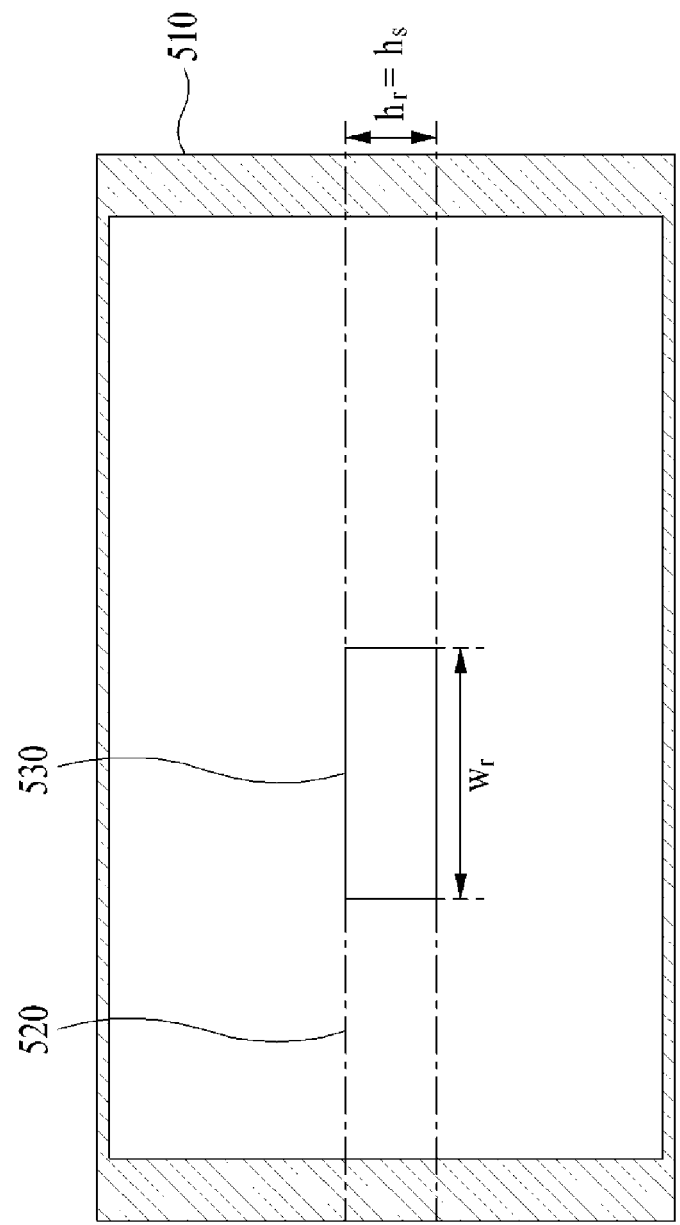
FIG. 5 is a diagram illustrating the procedure where a scan line-based processor unit according to an embodiment of the inventive concept sets a search range window.

FIG. 5 is a diagram illustrating the procedure where a scan line-based processor unit (SPU) according to an embodiment of the inventive concept sets a search range window.

Referring to FIG. 5, a multi-aperture camera system according to an embodiment of the inventive concept may set a search range window 530 at a scan line window 520 applied to a second image 510. Here, to search for a plurality of target pattern windows of the second image 510 corresponding to source pattern windows of a first image, the search range window 530 may mean a region corresponding to a constant width to the extent that a plurality of target pattern windows exists on a scan line window 520 applied to the second image 510. That is, the SPU included in the multi-aperture camera system may set the search range window 530 to reduce the complexity of the operation to search for the plurality of target pattern windows.

Thus, the SPU may store the search range window 530, set as described above, in a search range buffer. The SPU may load the search range window 530 if necessary and may use it during the procedure for determining a depth (i.e., the procedure for searching for a plurality of target pattern windows which are used to perform image pattern matching with respect to a source pattern window).

At this time, the SPU may set the search range window 530 based on the source pattern window. For example, a height $h_r$ of the search range window 530 may be set based on a height $h_s$ of the scan line window 520 described with reference to FIG. 2 (e.g., a height of the search range window 530 is set the same as a height of the scan line window 520). A width $W_r$ of the search range window 530 may be set, as shown in Equation 2, based on a misalignment angle between an offset direction of the first aperture and the second aperture and a horizontal direction of the image sensor, a maximum disparity generated between the first image and the second image 510 as center positions of the first and second apertures are deviated from each other, and a width $W_p$ of the source pattern window described with reference to FIG. 4.

$$w_r = w_p + 2 \cdot \text{Disparity}_{max} \cdot \cos \theta \qquad \text{[Equation 2]}$$

In Equation 2, $W_r$ denotes a width of the search range window 530 and $W_p$ denotes a width of the source pattern window. Disparity$_{max}$ denotes a maximum disparity generated between the first image and the second image 510 as the first aperture and the second aperture are deviated from each other. θ denotes a misalignment angle between an offset direction of the first aperture and the second aperture and a horizontal direction of the image sensor.

Here, a height $h_s$ of the scan line window 520 may be set based on a misalignment angle between an offset direction of the first aperture and the second aperture and a horizontal direction of the image sensor, a maximum disparity generated between the first image and the second image 510 as center positions of the first and second apertures are deviated from each other, and a height $h_p$ of the source pattern window, as described with reference to FIG. 2. For this reason, the height of the search range window 530 may be set based on the height of the source pattern window.

Figure 6:
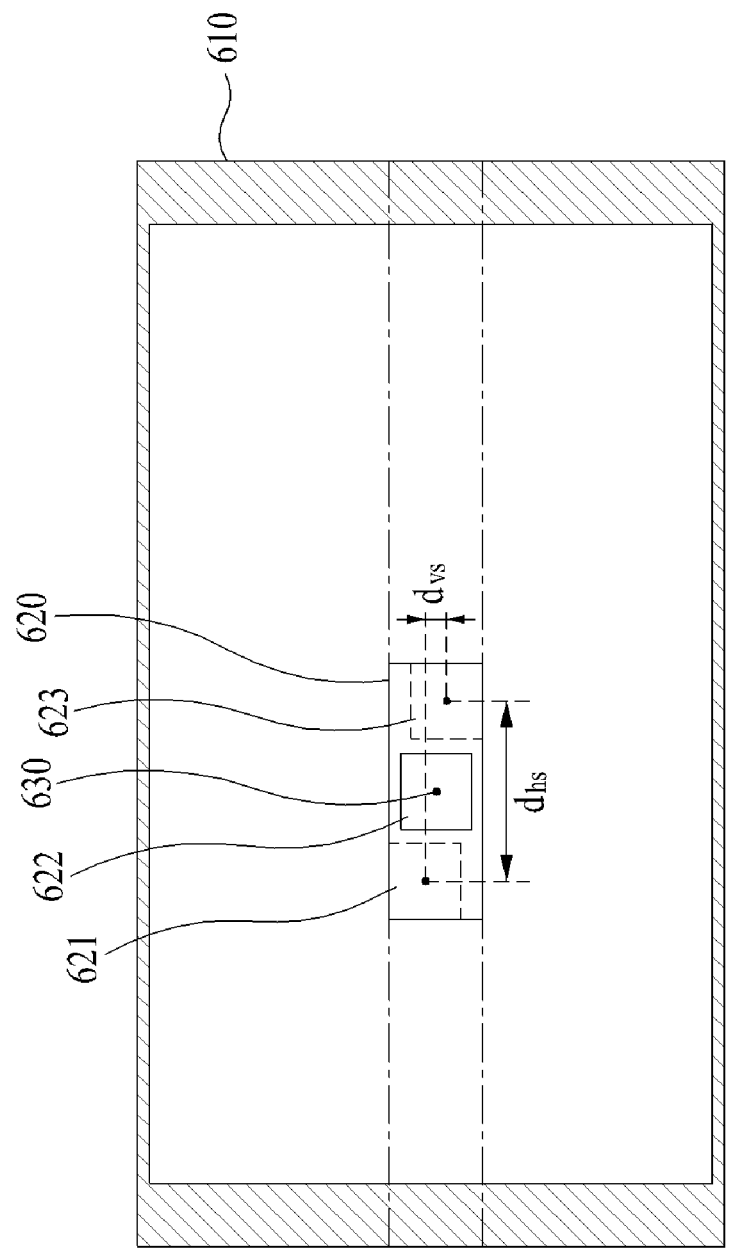
FIG. 6 is a diagram illustrating the procedure where a scan line-based processor unit according to an embodiment of the inventive concept searches for a plurality of target pattern windows.

FIG. 6 is a diagram illustrating the procedure where a scan line-based processor unit (SPU) according to an embodiment of the inventive concept searches for a plurality of target pattern windows.

Referring to FIG. 6, the scan line-based processor unit (SPU) included in the multi-aperture camera system according to an embodiment of the inventive concept may search for a plurality of target pattern windows 621, 622, and 623 from a search range window 620 of a second image 610. Here, the plurality of target pattern windows 621, 622, and 623 may mean regions corresponding to source pattern windows of a first image on a basis of at least one pixel 630.

For example, the SPU may search for a plurality of target pattern windows 621, 622, and 623 included in search range window 620 based on a horizontal moving range $d_h$ and a vertical moving range $d_{vs}$ about at least one pixel 630 and may store them in a target buffer. The SPU may load the target pattern windows 621, 622, and 623 if necessary and may use the loaded target pattern windows 621, 622, and 623 during the depth determination procedure (i.e., the procedure for calculating a correlation between each of the target pattern windows 621, 622, and 623 and a source pattern window by performing image pattern matching about the target pattern windows 621, 622, and 623 with respect to the source pattern window). In FIG. 6, an embodiment of the inventive concept is exemplified as at least two of the target pattern windows 621, 622, and 623 are found. However, the scope and spirit of the inventive concept may not be limited thereto. For example, the number of the found target pattern windows may be variously changed and searched.

As such, in the case that the target pattern windows 621, 622, and 623 are found, the SPU may calculate a correlation between each of the target pattern windows 621, 622, and 623 and the source pattern window by performing the image pattern matching about the target pattern windows 621, 622, and 623 with respect to the source pattern window. For example, the SPU may calculate a correlation between each of the target pattern windows 621, 622, and 623 and the source pattern window using similarity/dissimilarity metrics such as a normalized cross correlation (NCC) algorithm or a sum of absolute difference (SAD) algorithm.

Afterward, the SPU may determine at least one target pattern window, which maximizes the correlation, from among the target pattern windows 621, 622, and 623 as shown in Equation 3.

$$\arg\max_{Disparity} \{\text{corr}(\text{Disparity})\} \qquad \text{[Equation 3]}$$

Thus, the SPU may determine a depth at the at least one pixel 630 using a disparity between a source pattern window and a target pattern window, which maximizes the correlation, from among the target pattern windows 621, 622, and 623.

The determined depth may be stored in a depth frame buffer. Here, the depth frame buffer may be included in a scan line buffer or a plurality of frame buffers or may be implemented with a separate buffer.

FIG. 7 is a diagram illustrating an algorithm about an operation of a scan line-based processor unit (SPU) according to an embodiment of the inventive concept.

Referring to FIG. 7, distance determination operations of the SPU described with reference to FIGS. 2 and 6 are illustrated as an algorithm.

In detail, as shown in line 1 of the algorithm, after setting a scan line window applied to first and second images, the SPU may set a search range window based on a source pattern window set so as to include at least one pixel at the scan line window applied to a first image as shown in lines 2 to 3.

Next, as shown in lines 4 to 6 of the algorithm, the SPU may search for the target pattern windows from the search range window; the SPU may perform image pattern matching about a plurality of target pattern windows with respect to the source pattern window and may calculate a correlation between each of the target pattern windows and the source pattern window.

Then, as shown in Lines 7 to 8 of the algorithm, the SPU may search for a target pattern window, which maximizes the correlation, from among the plurality of target pattern windows and thus the SPU may determine a depth of at least one pixel using a disparity between the target pattern window and a source pattern window.

As shown in line 9 of the algorithm, the determined depth may be stored in a depth frame buffer. Furthermore, when a distance is determined and stored, the SPU may apply a scan line window to a next line in a vertical direction of each of first and second images as shown in line 11. In addition, as described above, lines 2 to 9 of the algorithm may be repeated at a next line of each of the first and second images.

Figure 8:
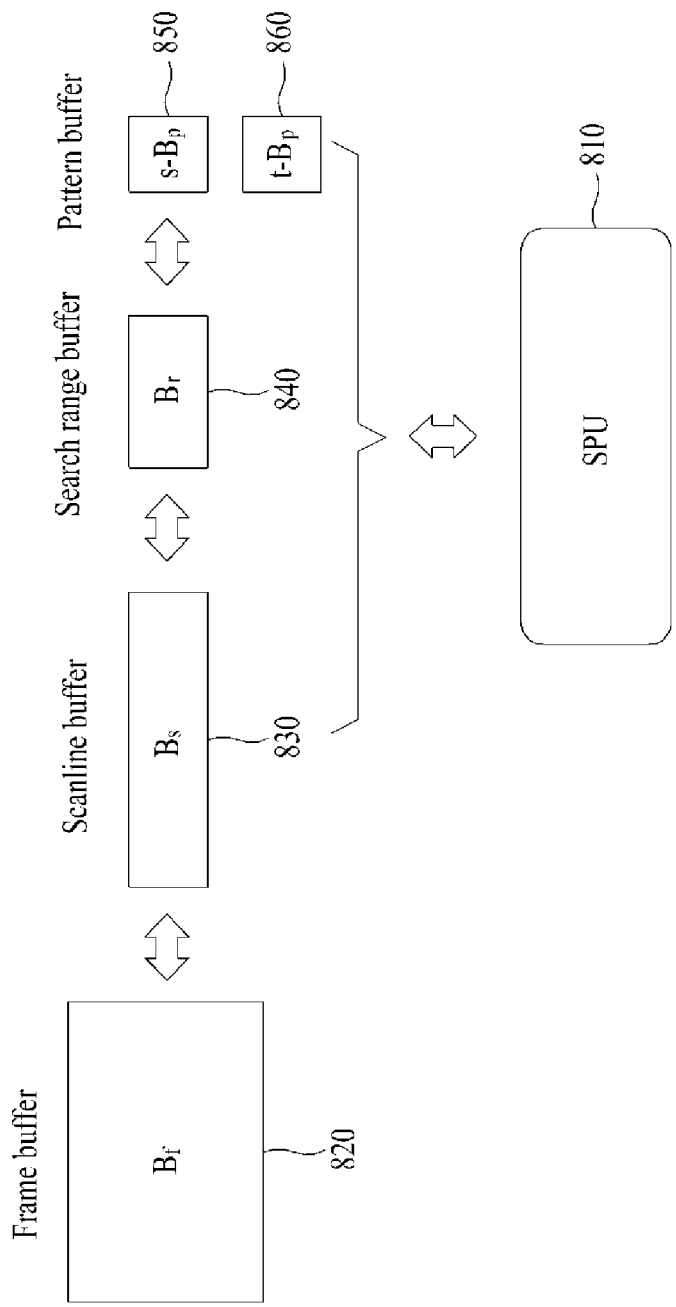
FIG. 8 is a diagram illustrating operations of buffers included in a scan line-based processor unit according to an embodiment of the inventive concept.

FIG. 8 is a diagram illustrating operations of buffers included in the SPU according to an embodiment of the inventive concept.

Referring to FIG. 8, during the depth determining procedure described with reference to FIGS. 2 to 6, the SPU 810 included in the multi-aperture camera system according to an embodiment of the inventive concept may control a scan line buffer 830, a search range buffer 840, a source pattern buffer 850 and a target pattern buffer 860 from among a plurality of frame buffers 820 in which first and second images are respectively stored, the scan line buffer 830 in which scan line windows applied to the first and second images are stored, the search range buffer 840 in which a search range window is stored, the source pattern buffer 850 in which a source pattern window is stored, and the target pattern buffer 860 in which a plurality of target windows is stored.

In FIG. 8, an embodiment of the inventive concept is exemplified as a depth frame buffer is included in the scan line buffer 830 or in a plurality of buffers. However, the scope and spirit of the inventive concept may not be limited thereto. For example, the depth frame buffer may be implemented with an independent buffer. In this case, the SPU 810 may additionally control a separate depth frame buffer during the depth determination procedure.

The frame buffers 820 may operate when each of the first and second images is obtained from an image sensor and need not operate after the SPU 810 performs a load operation during the procedure for applying a scan line window to each of the first and second images. Thus, the SPU 810 may minimize the access to the frame buffers 820 as a large size of memory during the depth determination procedure, thereby preventing an unnecessary operation of the buffers and improving the complexity of operation markedly.

Figure 9:
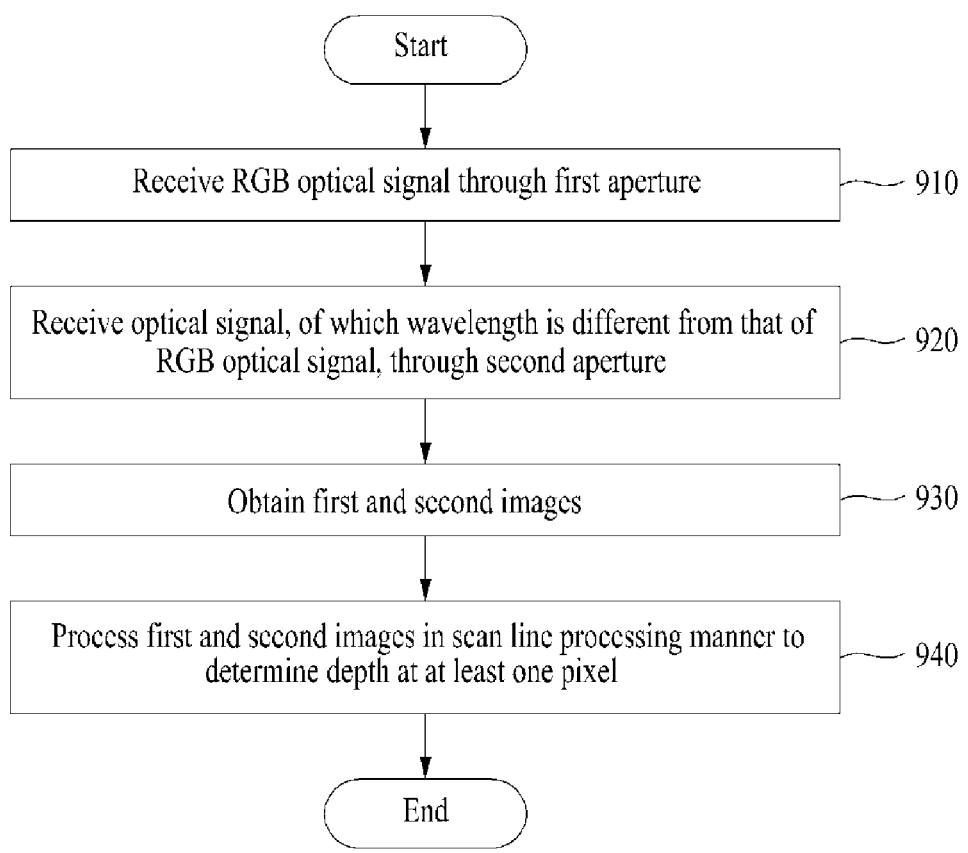
FIG. 9 is a flow chart illustrating an operating method of a multi-aperture camera system according to an embodiment of the inventive concept.

FIG. 9 is a flow chart illustrating an operating method of a multi-aperture camera system according to an embodiment of the inventive concept.

Referring to FIG. 9, an operating method of a multi-aperture camera system according to an embodiment of the inventive concept is performed by the multi-aperture camera system including a first aperture, a second aperture, an image sensor, and a SPU.

The multi-aperture camera system may receive an RGB optical signal through the first aperture (910).

The multi-aperture camera system may receive an optical signal, of which the wavelength is different from that of the RGB optical signal, through the second aperture distinguished from the first aperture.

Here, the first and second apertures may be formed on a single optical system so as to be offset in a horizontal direction of the image sensor and thus have center positions deviated from each other.

Next, the multi-aperture camera system may process, at the image sensor, an RGB optical signal received by the first aperture and optical signals of wavelengths different from the RGB optical signals received by the second aperture and may obtain the first and second images (930). At this time, although not illustrated in the drawings, the multi-aperture camera system may store the first and second images in a plurality of frame buffers.

Next, the multi-aperture camera system may process, at the scan line-based processor unit (SPU), the first and second images using the scan line processing technique and may determine a depth at the at least one pixel of the first and second images (940), which will be described in detail with reference to FIG. 10.

Figure 10:
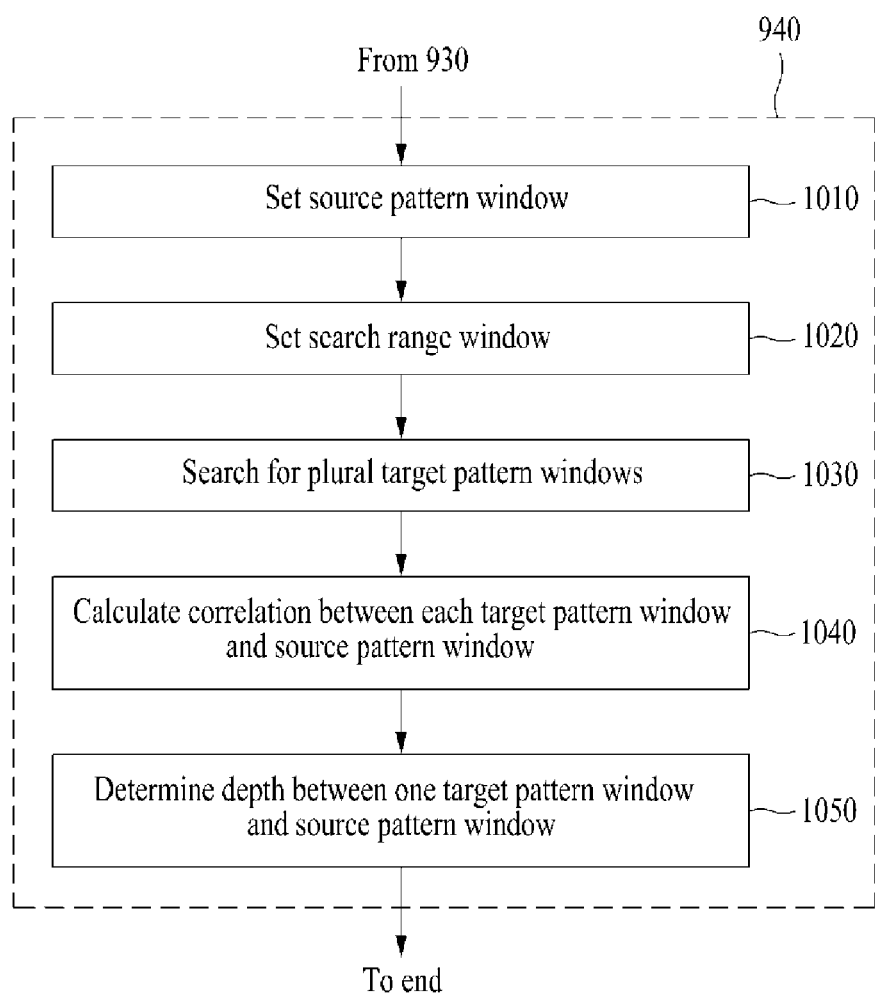
FIG. 10 is a flowchart illustrating a step of determining a depth, illustrated in FIG. 9.

FIG. 10 is a flowchart illustrating a step of determining a depth, illustrated in FIG. 9.

Referring to FIG. 10, the multi-aperture camera system may set a source pattern window so as to include at least one pixel at a scan line window applied to the first image (1010). For example, the multi-aperture camera system may set a source pattern window with respect to a remaining region other than a predetermined boundary region at the scan line window applied to the first image. In addition, the multi-aperture camera system may determine a height and a width of the source pattern window such that the image pattern matching is performed with respect to the at least one pixel.

Here, although not illustrated in the drawings, before setting a source pattern window (1010), the multi-aperture camera system may set a scan line window based on a misalignment angle between an offset direction of the first aperture and the second aperture and a horizontal direction of the image sensor, a maximum disparity generated between the first image and the second image as center positions of the first and second apertures are deviated from each other, a height of the source pattern window, the first image, and a width of the first image and may apply the scan line window to each of the first and second images.

Next, the multi-aperture camera system may set a search range window at the scan line window applied to the second image based on the source pattern window (1020).

In detail, the multi-aperture camera system may set a search range window based on a misalignment angle between an offset direction of the first and second apertures and a horizontal direction of the image sensor, a maximum disparity generated between the first image and the second image as center positions of the first and second apertures are deviated from each other, a width of the source pattern window, and a height of the scan line window.

Next, the multi-aperture camera system may search for a plurality of target pattern windows from the search range window (1030).

At this time, the multi-aperture camera system may search for a region of the search range window based on a misalignment angle between an offset direction of the first and second apertures and a horizontal direction of the image sensor and may set a plurality of target pattern windows based on the search result. For example, the multi-aperture camera system may search for the region of the search range window in horizontal and vertical directions based on a misalignment angle between an offset direction of the first and second apertures and a horizontal direction of the image sensor and may set a plurality of target pattern windows based on the search result. A height and a width of each of the plurality of target pattern windows may be determined based on a height and a width of the source pattern window.

Next, the multi-aperture camera system may perform image pattern matching about the target pattern windows with respect to the source pattern window and may calculate a correlation between each of the target pattern windows and the source pattern window (1040).

For example, the multi-aperture camera system may calculate a correlation between each of a plurality of target pattern windows and a source pattern window using similarity/dissimilarity metrics such as a normalized cross correlation (NCC) algorithm or a sum of absolute difference (SAD) algorithm.

Afterwards, the multi-aperture camera system may determine a depth at the at least one pixel using a disparity between the source pattern window and a target pattern window, which maximizes the correlation, from among a plurality of target pattern windows (1050).

In this case, the multi-aperture camera system may change a height and a width of the source pattern window and the target pattern windows into a plurality of values and may search for the region of the search range window to set a plurality of target windows.

That is, the multi-aperture camera system may iteratively perform steps 1010 to 1040 while changing a height and a width of the source pattern windows and the target pattern windows into a plurality of values (as the height and width of the source pattern window and the target pattern windows are changed into a plurality of values, a height and a width of each of the scan line window and search range windows may also be changed into a plurality of values).

Thus, in step 1050, the height and width of the source pattern window and the target pattern windows may be changed into the plurality of values, and the depth may be determined using a disparity between a source pattern window and a target pattern window which have the highest correlation.

For example, in steps 1010 to 1030, the multi-aperture camera system may set a height and a width of each of the source pattern window and the target pattern windows to a first value and may search for first, second, and third target pattern windows of the first value based on a source pattern window of the first value. In step 1040, the multi-aperture camera system may calculate a correlation between the first target pattern window and the source pattern window of the first value, a correlation between the second target pattern window and the source pattern window of the first value, and a correlation between the third target pattern window and the source pattern window of the first value.

Next, the multi-aperture camera system may repeat steps 1010 to 1030 to set a height and a width of each of the source pattern window and the target pattern windows to a second value and to search for a first target pattern window of the second value, a second target pattern window of the second value, and a third target pattern window of the second value based on the second value. The multi-aperture camera system may repeat step 1040 to calculate a correlation between a first target pattern window and a source pattern window of the second value, a correlation between a second target pattern window and the source pattern window of the second value, and a correlation between a third target pattern window and the source pattern window of the second value.

Afterwards, in step 1050, the multi-aperture camera system may select the first target pattern window of the first value and the source pattern window of the first value, which has the highest correlation, from among the correlation between the first target pattern window and the source pattern window of the first value, the correlation between the second target pattern window and the source pattern window of the first value, the correlation between the third target pattern window and the source pattern window of the first value, the correlation between a first target pattern window and a source pattern window of the second value, the correlation between a second target pattern window and the source pattern window of the second value, and the correlation between a third target pattern window and the source pattern window of the second value, and thus the multi-aperture camera system may determine a depth at at least one pixel using a disparity between the first target window and the source pattern window of the selected first value.

Although not illustrated in the drawings, the multi-aperture camera system may store the depth at the at least one pixel in a depth frame buffer.

When the depth is determined and stored, the multi-aperture camera system may sequentially apply the scan line window to a next line in a vertical direction of the first and second images such that steps 1010 to 1050 are repeated with respect to the whole region of the first and second images.

In addition, although not illustrated in the drawings, the multi-aperture camera system may scan a plurality of focused object distances using a single optical system moved so as to be arranged at a plurality of positions on the basis of an image sensor and may determine a depth at at least one pixel about the object.

In this case, an image sensor may obtain a plurality of image sets corresponding to the plurality of positions as a single optical system is disposed at the plurality of positions (a single optical system being disposed on a relative position based on the image sensor). Here, each of the plurality of image sets may include a first image obtained by processing the RGB optical signal received by the first aperture and a second image obtained by processing the IR optical signal received by the second aperture. For example, the image sensor may obtain a P1 image set (a P1-RGB image and a P1-IR image) as the single optical system is disposed at a P1 position, may obtain a P2 image set (a P2-RGB image and a P2-IR image) as the single optical system is disposed at a P2 position and may obtain a P3 image set (a P3-RGB image and a P3-IR image) as the single optical system is disposed at a P3 position.

Thus, the multi-aperture camera system may determine a depth at the at least one pixel of a plurality of image sets using a disparity of each of the image sets through the SPU. In detail, the multi-aperture camera system may calculate a correlation (a correlation between the P1-RGB image and the P1-IR image, a correlation between the P2-RGB image and P2-IR image, and a correlation between the P3-RGB image and the P3-IR image) with regard to each of the image sets and may determine a depth about an object using a disparity of at least one of the image sets based on a correlation of each of the image sets.

In this case, after the multi-aperture camera system calculates a correlation of each of the image sets and obtains a disparity of each of the image sets, the multi-aperture camera system may select one image set, which has the highest correlation, from among the image sets and may determine the depth about the object using a disparity at the selected one image set.

In an embodiment, a multi-aperture camera system may generate a table which includes depths respectively calculated based on ideal disparities of a plurality of positions at which a single optical system is disposed as illustrated in Table 1. The multi-aperture camera system may select one image set, which has the highest correlation, from among a plurality of image sets and may ascertain a specific position, at which the single optical system is disposed, when the selected one image set is obtained, and thus the multi-aperture camera system may determine an object depth, which is calculated based on an ideal disparity of the specific position at which the single optical system is disposed, as a depth about the object based on the following Table 1.

TABLE 1

| Positions of Single Optical System | Ideal Disparities | Depths |
|---|---|---|
| Position 1 | Disparity 1 | Depth 1 |
| Position 2 | Disparity 2 | Depth 2 |
| Position 3 | Disparity 3 | Depth 3 |
| ... | ... | ... |

In another embodiment, the multi-aperture camera system may select a P1 image set, which has the highest correlation (or which has the lowest disparity), from among a plurality of image sets by calculating a correlation between the P1-RGB image and the P1-IR image, a correlation between the P2-RGB image and the P2-IR image, and a correlation between the P3-RGB image and the P3-IR image and obtaining a disparity between the P1-RGB image and the P1-IR image, a disparity between the P2-RGB image and the P2-IR image, and a disparity between the P3-RGB image and the P3-IR image based on the calculated correlation. As such, the multi-aperture camera system may determine a depth between objects using a disparity between the P1-RGB image and the P1-IR image which constitute the P1 image set.

In addition, the multi-aperture camera system may not only select as one image set, which has the highest correlation, from among the image sets, but the multi-aperture camera system may also select a part of the image sets and may determine a depth about an object using a disparity of each of the selected image sets.

For example, after calculating a correlation of each of the image sets to obtain a disparity of each of the image sets, the multi-aperture camera system may select a part of the image sets based on a correlation of each of the image sets. Afterwards, the multi-aperture camera system may determine a depth about an object by applying a weight to a depth calculated from a disparity of each of the selected image sets.

In more detail, after calculating a correlation of each of the image sets to obtain a disparity of each of the image sets, the multi-aperture camera system may select two image sets, a disparity sign of each of which is changed, from among the image sets (e.g., when a disparity sign of the P1 image set is positive (+) and a disparity sign of the P2 image set is negative (−), the P1 image set and the P2 image set are selected). Afterwards, the multi-aperture camera system may determine a weighted average (an average in which a weight is applied to each of depths respectively calculated from disparities of the P1 and P2 image sets) of a depth calculated from a disparity of each of the two image sets, a disparity sign of each of which is changed, as a depth about an object.

As such, the multi-aperture camera system according to an embodiment of the inventive concept may determine a depth about an object more exactly by using a disparity of each image set obtained while moving a single optical system so as to be disposed at a plurality of positions relative to an image sensor.

Figure 11:
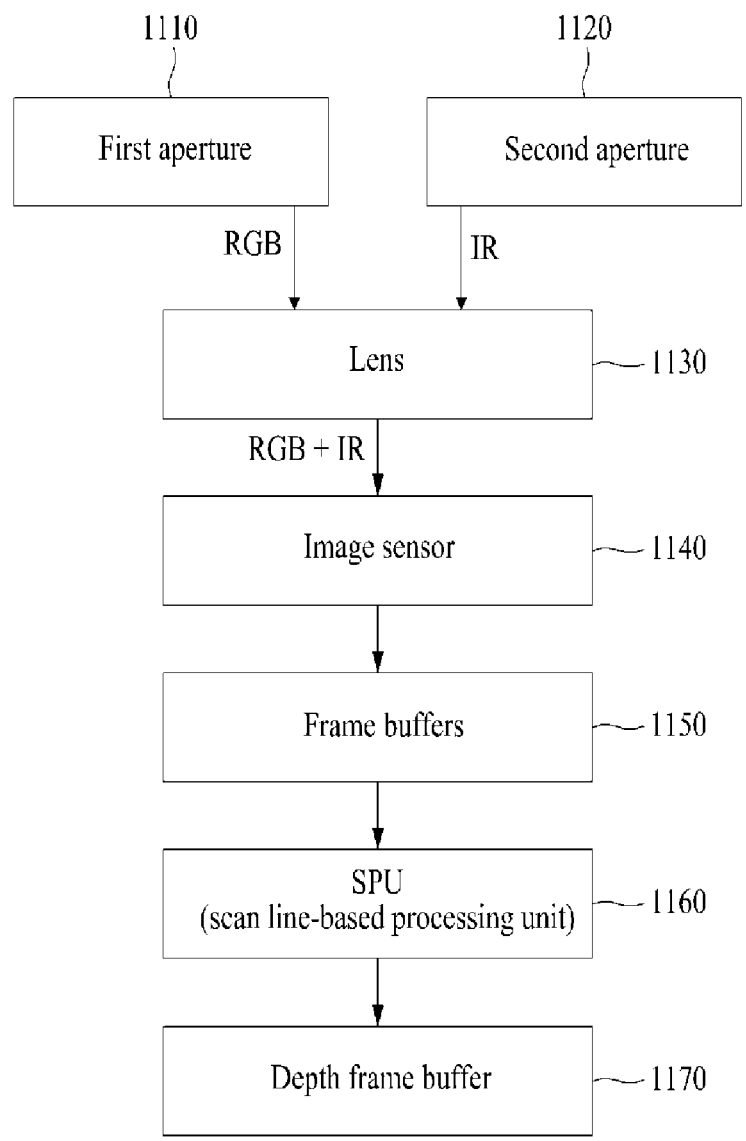
FIG. 11 is a diagram illustrating a multi-aperture camera system according to an embodiment of the inventive concept.

FIG. 11 is a diagram illustrating a multi-aperture camera system according to an embodiment of the inventive concept.

Referring to FIG. 11, a multi-aperture camera system according to an embodiment of the inventive concept may include a first aperture 1110, a second aperture 1120, a lens 1130, an image sensor 1140, a plurality of frame buffers 1150, a SPU 1160, and a depth frame buffer 1170.

The first aperture 1110 may receive an RGB optical signal.

The second aperture 1120 may be distinguished from the first aperture 1110 and may receive an optical signal of which the wavelength is different from that of the RGB optical signal.

Here, a first aperture 1110 and a second aperture 1120 may be formed on a single optical system (i.e., about a single lens) so as to be offset in a horizontal direction of an image sensor 1140 and thus have center positions deviated from each other.

The lens 1130 may receive an RGB optical signal received through the first aperture 1110 and an optical signal, of which the wavelength is different from that of the RGB optical signal, received through second aperture 1120.

The image sensor 1140 may obtain a first image by processing the RGB optical signal received through the first aperture 1110 and may obtain a second image by processing the optical signal, of which the wavelength is different from that of the RGB optical signal, received through second aperture 1120. At this time, the image sensor 1140 may mean a complex module which performs a function of the image signal processor (ISP).

The plurality of frame buffer 1150 may store the first and second images obtained from the image sensor 1140, respectively. Thus, the SPU 1160 may load the first and second images from the frame buffers 1150 and may use the first and second images during the depth determination procedure to be described later.

The SPU 1160 may determine a depth at the at least one pixel of the first image and the second image by processing the first and second images using the scan line processing technique, which will be described in detail with reference to FIG. 12.

The depth frame buffer 1170 may store a depth at the at least one pixel. At this time, the depth frame buffer 1170 may be included in the plurality of frame buffer 1150 or a scan line buffer to be described later.

Figure 12:
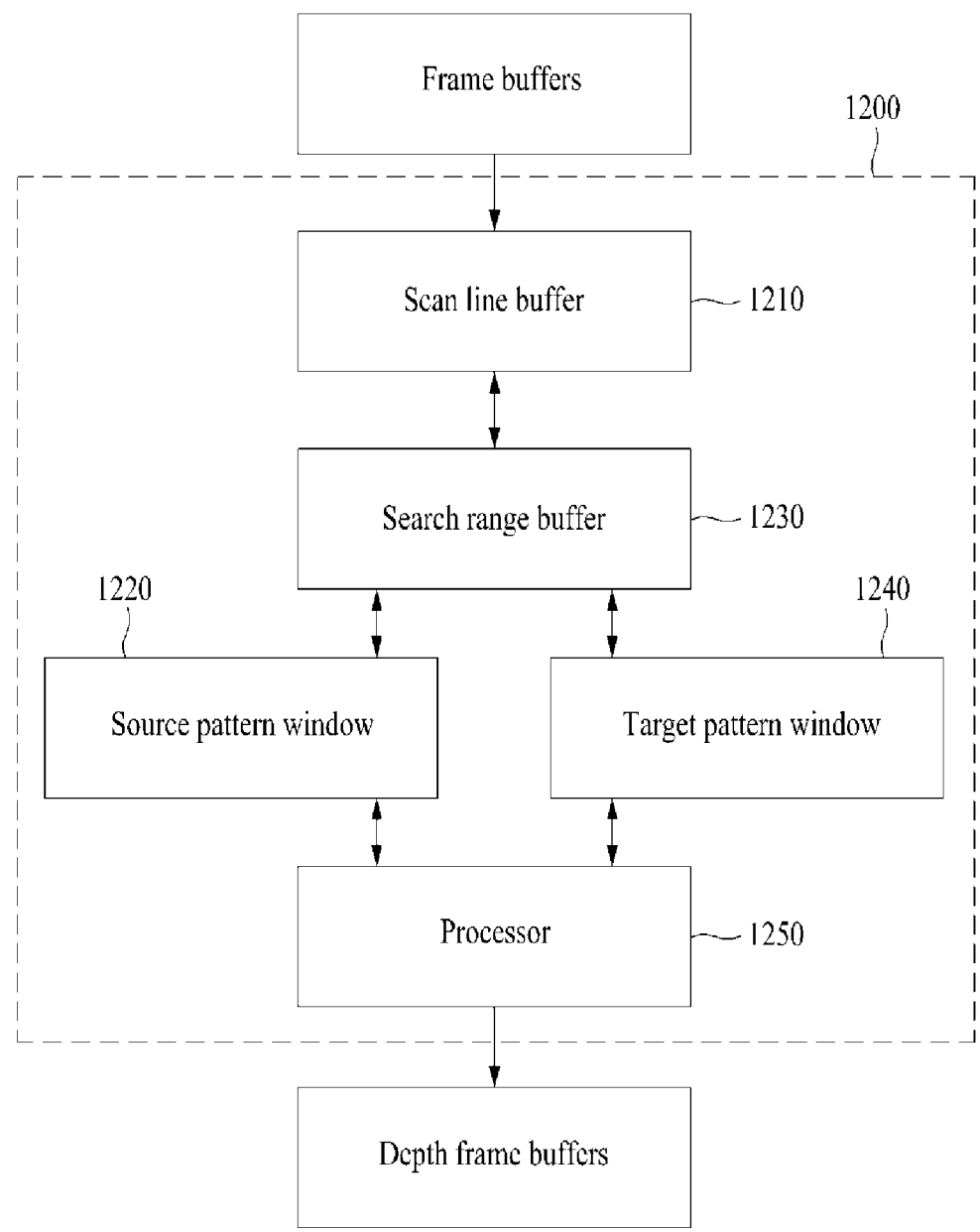
FIG. 12 is a block diagram illustrating a scan line-based processor unit illustrated in FIG. 11.

FIG. 12 is a block diagram illustrating an SPU illustrated in FIG. 11.

Referring to FIG. 12, an SPU 1200 may include a scan line buffer 1210, a source pattern buffer 1220, a search range buffer 1230, a target pattern buffer 1240, and a processor 1250.

The scan line buffer 1210 may store a scan line window applied to the first image and a scan line window applied to the second image.

The source pattern buffer 1220 may store a source pattern window set to include at least one pixel at the scan line window applied to the first image.

The search range buffer 1230 may store a search range window set based on the source pattern window at the scan line window applied to the second image.

The target pattern buffer 1240 may store a plurality of target pattern windows found in the search range window.

The processor 1250 may control an operation of each of the frame buffers, the scan line buffer 1210, the source pattern buffer 1220, the search range buffer 1230, and the target pattern buffer 1240. The processor 1250 may perform image pattern matching about the target pattern windows with respect to a source pattern window and may calculate a correlation between each of a plurality of target pattern windows and a source pattern window. The processor 1250 may determine a depth at the at least one pixel using a disparity between a source pattern window and a target pattern window, which maximizes the correlation, from among the of target pattern windows.

In addition, the processor 1250 may search for a region of the search range window based on a misalignment angle between an offset direction of the first and second apertures and a horizontal direction of the image sensor and may set the target pattern windows. For example, the processor 1250 may search for a region of the search range window in horizontal and vertical directions in the light of a misalignment angle between an offset direction of the first and second apertures and a horizontal direction of the image sensor and may set the target pattern windows. A height and a width of each of the target pattern windows may be determined based on a height and a width of the source pattern window.

Furthermore, the processor 1250 may set a height of the scan line window based on a misalignment angle between an offset direction of the first and second apertures and a horizontal direction of the image sensor, a maximum disparity generated between the first image and the second image as center positions of the first and second apertures are deviated from each other, a height of the source pattern window and may set a width of the scan line window based on a first image and a width of the first image. The scan line window thus set may be applied to each of the first and second images by the processor 1250.

In addition, the processor 1250 may set a width of the search range window based on a misalignment angle between an offset direction of the first and second apertures and a horizontal direction of the image sensor, the maximum disparity generated between the first image and the second image as center positions of the first and second apertures are deviated from each other, a height of the source pattern window and may set a height of the search range window based on a height of the scan line window.

Furthermore, the processor 1250 may set a source pattern window with respect to the remaining region other than a predetermined boundary region at a scan line window applied to the first image.

At this time, the processor 1250 may determine a height and a width of the source pattern window such that image pattern matching is performed with respect to at least one pixel.

In particular, the processor 1250 may search for a plurality of target pattern windows at the search range window. For example, the processor 1250 may set a plurality of target pattern windows by searching a region of the search range window based on a misalignment angle between an offset direction of the first and second apertures and a horizontal direction of the image sensor.

Moreover, the processor 1250 may calculate a correlation between each of a plurality of target pattern windows and a source pattern window using similarity/dissimilarity metrics such as a normalized cross correlation (NCC) or sum of absolute difference (SAD) algorithm.

As such, when the depth is determined, the processor 1250 may store a depth at the at least one pixel in a depth frame buffer.

When the depth is determined and stored, the processor 1250 may sequentially apply the scan line window to a next line in a vertical direction of the first and second images such that the depth determination operation is repeated with respect to the whole region of the first and second images.

Embodiments of the inventive concepts provide a multi-aperture camera system determining a depth at the at least one pixel with respect to an object by processing images, obtained through a plurality of apertures which are formed on a single optical system so as to be offset in a vertical direction of an image sensor and thus have center positions deviated from each other, using hardware technique and an operating method thereof.

In detail, embodiments of the inventive concept provide the multi-aperture camera system determining a depth at the at least one pixel with respect to an object by processing images, obtained through a plurality of apertures which are formed on a single optical system so as to be offset in a vertical direction of an image sensor and thus have center positions deviated from each other, using a scan line technique and an operating method thereof.

In addition, embodiments of the inventive concept may provide the multi-aperture camera system which, during the procedure for processing a first image received by a first aperture and a second image received by a second aperture using the scan line technique, changes a height and a width of each of a source pattern window, which is set to include at least one pixel of the first image, and a plurality of target pattern windows, which are set by searching for a region of a search range window from the second image, to a plurality of values and searches for the target pattern windows and an operating method thereof.

Thus, embodiments of the inventive concept provide the multi-aperture camera system which is smaller in size than a conventional stereo camera and is manufactured at small cost, and an operating method thereof.

In addition, embodiments of the inventive concept provide the multi-aperture camera system which prevents inaccurate depth calculation due to a calibration error by skipping calibration required by a conventional stereo camera and an operating method thereof.

In addition, embodiments of the present disclosure provide the multi-aperture camera system capable of markedly improving the complexity of computation by aligning an offset direction of first and second apertures in a vertical direction of an image sensor such that a scan line processing technique is easily applied and an operating method thereof.

In addition, embodiments of the inventive concepts provide the multi-aperture camera system capable of obtaining a high-quality RGB image with low complexity without additional image signal processing by receiving an RGB optical signal through a first aperture without loss and an operating method thereof.

Although embodiments have been described and specific examples as described above, one of ordinary skill in the art can be various modifications, additions and substitutions from the description above. For example, the described techniques are performed in the described way and in a different order, or, and/or described system, architecture, device, circuit methods described components, such as are and be coupled or combined with the other embodiment, other components equal or even replaced by water or a suitable replacement results can be achieved.

Therefore, other implementations, other embodiments and equivalent claims and things may be within the scope of the patent claims.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A multi-aperture camera system using a scan line processing technique, comprising:

a first aperture receiving an RGB optical signal;
a second aperture distinguished from the first aperture and receiving an optical signal of which a wavelength is different from that of the RGB optical signal;
an image sensor obtaining a first image by processing the RGB optical signal received by the first aperture and obtaining a second image by processing the optical signal, of which the wavelength is different from that of the RGB optical signal, received by the second aperture;
a plurality of frame buffers, wherein the first and second images are respectively stored in the frame buffers; and
a scan line-based processor unit (SPU) processing the first and second images using a scan line processing technique to determine a depth at at least one pixel of the first and second images,
wherein the first aperture and the second aperture are formed on a single optical system so as to be offset in a horizontal direction of the image sensor and thus have center positions deviated from each other, wherein the SPU comprises:
a scan line buffer storing a scan line window applied to the first image and a scan line window applied to the second image are stored;
a source pattern buffer storing a source pattern window set to comprise the at least one pixel at the scan line window applied to the first image;
a search range buffer storing a search range window set based on the source pattern window at the scan line window applied to the second image;
a target pattern buffer storing a plurality of target pattern windows found at the search range window; and
a processor controlling an operation of each of the plurality of frame buffers, the scan line buffer, the source pattern buffer, the search range buffer, and the target pattern buffer, calculating a correlation between each of the plurality of target pattern windows and the scan pattern window by performing image pattern matching about the plurality of target pattern windows with respect to the source pattern window, and determining a depth at the at least one pixel using a disparity between the source pattern window and a target pattern window, which maximizes the correlation, from among the plurality of target pattern windows, and
wherein the processor sets a height of the scan line window based on a misalignment angle between an offset direction of the first and second apertures and a horizontal direction of the image sensor, a maximum disparity generated between the first image and the second image as center positions of the first and second apertures are deviated from each other, a height of the source pattern window, and sets a width of the scan line window based on the first image and a width of the first image.

2. The multi-aperture camera system of claim 1, wherein the processor searches a region of the search range window based on a misalignment angle between an offset direction of the first and second apertures and a horizontal direction of the image sensor and sets the plurality of target pattern windows based on the search result.

3. The multi-aperture camera system of claim 2, wherein the processor searches the region of the search range window in horizontal and vertical directions and sets the plurality of target pattern windows based on the search result.

4. A multi-aperture camera system using a scan line processing technique, comprising:

a first aperture receiving an RGB optical signal;
a second aperture distinguished from the first aperture and receiving an optical signal of which a wavelength is different from that of the RGB optical signal;
an image sensor obtaining a first image by processing the RGB optical signal received by the first aperture and obtaining a second image by processing the optical signal, of which the wavelength is different from that of the RGB optical signal, received by the second aperture;
a plurality of frame buffers, wherein the first and second images are respectively stored in the frame buffers; and
a scan line-based processor unit (SPU) processing the first and second images using a scan line processing technique to determine a depth at at least one pixel of the first and second images,
wherein the first aperture and the second aperture are formed on a single optical system so as to be offset in a horizontal direction of the image sensor and thus have center positions deviated from each other, wherein the SPU comprises:
a scan line buffer storing a scan line window applied to the first image and a scan line window applied to the second image are stored;
a source pattern buffer storing a source pattern window set to comprise the at least one pixel at the scan line window applied to the first image;
a search range buffer storing a search range window set based on the source pattern window at the scan line window applied to the second image;
a target pattern buffer storing a plurality of target pattern windows found at the search range window; and
a processor controlling an operation of each of the plurality of frame buffers, the scan line buffer, the source pattern buffer, the search range buffer, and the target pattern buffer, calculating a correlation between each of the plurality of target pattern windows and the scan pattern window by performing image pattern matching about the plurality of target pattern windows with respect to the source pattern window, and determining a depth at the at least one pixel using a disparity between the source pattern window and a target pattern window, which maximizes the correlation, from among the plurality of target pattern windows, and
wherein the processor sets a width of the search range based on the misalignment angle between an offset direction of the first and second apertures and a horizontal direction of the image sensor, a maximum disparity generated between the first image and the second image as center positions of the first and second apertures are deviated from each other, a height of the source pattern window, and sets a height of the search range window based on the height of the scan line window.

5. A multi-aperture camera system using a scan line processing technique, comprising:

a first aperture receiving an RGB optical signal;
a second aperture distinguished from the first aperture and receiving an optical signal of which a wavelength is different from that of the RGB optical signal;
an image sensor obtaining a first image by processing the RGB optical signal received by the first aperture and obtaining a second image by processing the optical signal, of which the wavelength is different from that of the RGB optical signal, received by the second aperture;

a plurality of frame buffers, wherein the first and second images are respectively stored in the frame buffers; and a scan line-based processor unit (SPU) processing the first and second images using a scan line processing technique to determine a depth at at least one pixel of the first and second images, wherein the first aperture and the second aperture are formed on a single optical system so as to be offset in a horizontal direction of the image sensor and thus have center positions deviated from each other, wherein the SPU comprises:

a scan line buffer storing a scan line window applied to the first image and a scan line window applied to the second image are stored;

a source pattern buffer storing a source pattern window set to comprise the at least one pixel at the scan line window applied to the first image;

a search range buffer storing a search range window set based on the source pattern window at the scan line window applied to the second image;

a target pattern buffer storing a plurality of target pattern windows found at the search range window; and a processor controlling an operation of each of the plurality of frame buffers, the scan line buffer, the source pattern buffer, the search range buffer, and the target pattern buffer, calculating a correlation between each of the plurality of target pattern windows and the scan pattern window by performing image pattern matching about the plurality of target pattern windows with respect to the source pattern window, and determining a depth at the at least one pixel using a disparity between the source pattern window and a target pattern window, which maximizes the correlation, from among the plurality of target pattern windows, and wherein the processor changes a height and a width of each of the source pattern window and the plurality of target pattern windows into a plurality of values and searches for a region of the search range window to set the plurality of target pattern windows.

6. The multi-aperture camera system of claim 1, wherein the processor sets a source pattern window with respect to a remaining region other than a predetermined boundary region at the scan line window applied to the first image.

7. The multi-aperture camera system of claim 1, wherein the processor determines a height and width of the source pattern window such that the image pattern matching is performed with respect to the at least one pixel.

8. The multi-aperture camera system of claim 6, wherein the processor determines a height and a width of each of the plurality of target pattern windows based on the height and width of the source pattern window.

9. The multi-aperture camera system of claim 1, wherein the SPU further comprises:

a depth frame buffer storing a depth at the at least one pixel.

10. The multi-aperture camera system of claim 1, wherein the processor calculates a correlation between each of the plurality of target pattern windows and the source pattern window using a similarity/dissimilarity metric.

11. The multi-aperture camera system of claim 1, wherein the processor sequentially applies the scan line window in a vertical direction of each of the first and second images.

12. A method for operating a multi-aperture camera system using a scan line processing technique, the method comprising:

receiving an RGB optical signal through a first aperture;

receiving an optical signal, of which a wavelength is different from that of the RGB optical signal, through a second aperture distinguished from the first aperture;

obtaining first and second images by processing the RGB optical signal received by the first aperture and an signal, of which a wavelength is different from that of the RGB optical signal, received by the second aperture, at an image sensor; and processing the first and second images in a scan line processing manner to determine a depth at at least one pixel of the first and second images, at a scan line-based processor unit (SPU), wherein the first aperture and the second aperture are formed on a single optical system so as to be offset in a horizontal direction of an image sensor and thus have center positions deviated from each other, wherein the determining of the depth about the at least one pixel comprises:

setting a source pattern window so as to comprise the at least one pixel at a scan line window applied to the first image;

setting a search range window at a scan line window applied to the second image based on the source pattern window;

searching for a plurality of target pattern windows from the search range window;

calculating a correlation between each of the plurality of target pattern windows and the source pattern window by performing image pattern matching about the plurality of target pattern windows with respect to the source pattern window; and determining a depth at the at least one pixel using a disparity between the source pattern window and a target pattern window, which maximizes the correlation, from among the plurality of target pattern windows.

13. The method of claim 12, wherein the searching for the plurality of target pattern windows comprises:

searching a region of the search range window based on a misalignment angle between an offset direction of the first and second apertures and a horizontal direction of the image sensor and setting the plurality of target pattern windows based on the search result.

14. The method of claim 12, further comprising:

setting the scan line window based on a misalignment angle between an offset direction of the first and second apertures and a horizontal direction of the image sensor, a maximum disparity generated between the first image and the second image as center positions of the first and second apertures are deviated from each other, a height of the source pattern window, the first image, and a width of the first image.

15. The method of claim 12, wherein the setting of the search range window comprises:

setting the search range window based on a misalignment angle between an offset direction of the first and second apertures and a horizontal direction of the image sensor, a maximum disparity generated between the first image and the second image as center positions of the first and second apertures are deviated from each other, a width of the source pattern window, and a height of the scan line window.

16. The method of claim 12, wherein the searching for the plurality of target pattern windows from the search range window comprises:

changing a height and a width of the source pattern window and the plurality of target pattern windows into a plurality of values and searching for a region of the search range window to set the plurality of target pattern windows.

* * * * *